United States Patent
Bradburn et al.

(10) Patent No.: US 8,131,255 B2
(45) Date of Patent: Mar. 6, 2012

(54) SYSTEM FOR FACILITATING USE OF A SINGLE TELECOMMUNICATION DEVICE BY MULTIPLE USERS

(75) Inventors: Travis L. Bradburn, Ortonville, MI (US); Jason J. Parks, White Lake, MI (US)

(73) Assignee: General Motors LLC, Detroit, MI (US)

( * ) Notice: Subject to any disclaimer, the term of this patent is extended or adjusted under 35 U.S.C. 154(b) by 327 days.

(21) Appl. No.: 12/511,805

(22) Filed: Jul. 29, 2009

(65) Prior Publication Data

US 2011/0028123 A1  Feb. 3, 2011

(51) Int. Cl.
  *H04M 11/00* (2006.01)
(52) U.S. Cl. ........................................ 455/405; 379/111
(58) Field of Classification Search .................... None
  See application file for complete search history.

(56) References Cited

U.S. PATENT DOCUMENTS

| | | | |
|---|---|---|---|
| 6,904,141 B2 | 6/2005 | Jijina et al. | |
| 6,963,760 B2 | 11/2005 | Piwowarski | |
| 7,072,645 B2 | 7/2006 | Schwinke et al. | |
| 7,194,073 B2 | 3/2007 | Watkins et al. | |
| 7,382,873 B2 | 6/2008 | Jiddou | |
| 7,415,271 B2 | 8/2008 | Nicolini | |
| 2002/0172273 A1* | 11/2002 | Baker et al. | 375/222 |
| 2003/0100334 A1 | 5/2003 | Mazzara, Jr. | |
| 2003/0162525 A1 | 8/2003 | Stefan et al. | |
| 2005/0157862 A1 | 7/2005 | Jijina et al. | |
| 2005/0187763 A1 | 8/2005 | Arun | |
| 2006/0089100 A1 | 4/2006 | Patenaude et al. | |
| 2006/0193486 A1 | 8/2006 | Kargus, IV et al. | |
| 2006/0204026 A1 | 9/2006 | Kargus, IV | |
| 2007/0093250 A1 | 4/2007 | Italia et al. | |
| 2008/0137895 A1 | 6/2008 | Gratke et al. | |
| 2010/0027426 A1* | 2/2010 | Nair et al. | 370/238 |
| 2010/0332615 A1* | 12/2010 | Short et al. | 709/217 |
| 2011/0010581 A1* | 1/2011 | Tanttu et al. | 714/11 |

* cited by examiner

*Primary Examiner* — Ajit Patel
(74) *Attorney, Agent, or Firm* — Ingrassia Fisher & Lorenz, P.C.

(57) ABSTRACT

A system for facilitating the use of a single telecommunication device by multiple users is disclosed herein. The system includes, but is not limited to, a telecommunication component that is adapted for attachment to a vehicle and that is configured to utilize a telecommunication network that is configured to allot a predetermined amount of usage time units to the telecommunication component. The system also includes an electronic processing device that is associated with the telecommunication component. The electronic processing device is configured to allocate a portion of the usage time units to each user of a plurality of users of the telecommunication component.

20 Claims, 3 Drawing Sheets

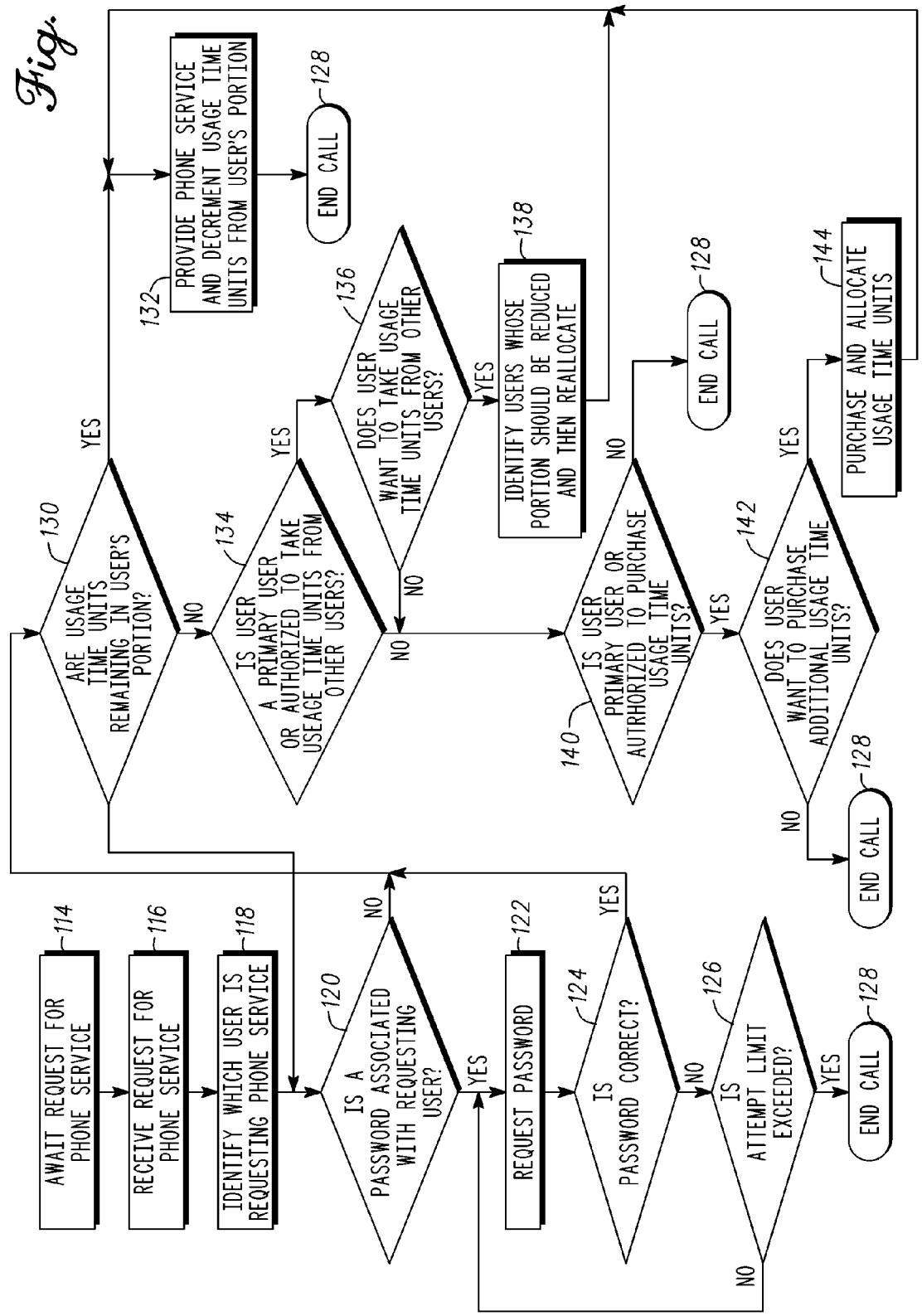

SYSTEM FOR FACILITATING USE OF A SINGLE TELECOMMUNICATION DEVICE BY MULTIPLE USERS

TECHNICAL FIELD

The technical field generally relates to telecommunication, and more particularly relates to a system for facilitating the use of a single telecommunication device by multiple users.

BACKGROUND

Some vehicle manufacturers include a built-in telematics unit in the vehicles that they offer for sale. Among other things, the telematics unit includes a telecommunication component that is configured to allow a vehicle operator to access and utilize existing cellular telecommunication networks, in effect turning the vehicle into a cellular mobile phone. The vehicle operator purchases an allotment of usage time units (typically measured in minutes) from the telecommunication network. The usage time units are assigned to an account associated with the vehicle. The usage time units represent an amount of time during which the user may access and utilize the cellular network for telecommunications. Once the usage time units are consumed, access to the cellular network is disabled until more usage time units are purchased.

The vehicle operator typically obtains the allotment of usage time units by contacting a call center that is operated by the vehicle manufacturer or by a related or affiliated business entity and requesting to purchase usage time units. The call center is designed to serve as an interface between the vehicle operator and the telecommunication company that operates the cellular network. In response to the vehicle operator's request, the call center contacts the telecommunication network and obtains an amount of usage time units requested by the vehicle operator, and then assigns the usage time units to an account associated with the vehicle.

A problem can arise, however, when the vehicle has multiple drivers/users. For instance, a vehicle shared between family members will have multiple vehicle operators, each able to make phone calls from the vehicle and each independently consuming usage time units without regard to consumption by the other drivers. This can lead to inequitable distribution and unexpected exhaustion of usage time units by one or more of the drivers. Such an uncontrolled consumption of usage time units may be disadvantageous to all of the drivers of the vehicle.

Accordingly, it is desirable to provide a system that provides a way to control the consumption of the usage time units. In addition, it is desirable to provide a system that allocates the usage time units among and between the various operators of a vehicle. Furthermore, other desirable features and characteristics will become apparent from the subsequent detailed description and the appended claims, taken in conjunction with the accompanying drawings and the foregoing technical field and background.

SUMMARY

A system is provided for facilitating the use of a single telecommunication device by multiple users. In a first, non-limiting example, the system includes, but is not limited to, a telematics unit that is adapted to be attached to a vehicle. The telematics unit is designed, programmed and constructed to utilize a telecommunication network that allots usage time units to the telematics unit. An electronic processing device associated with the telematics unit is programmed to allocate a portion of the allotted usage time units to each individual user in a group of users of the telematics unit.

In a second non-limiting example, the system includes, but is not limited to, a telecommunication network that is designed and constructed to allot usage time units to a telecommunication device. The system also includes a telematics unit that is adapted to be attached to a vehicle and designed, programmed and constructed to utilize the telecommunication network. An electronic processing device associated with the telecommunication network is programmed to allocate a portion of the usage time units that have been allotted to the telematics unit to each individual user in a group of users of the telematics unit.

In a third non-limiting example, the system includes, but is not limited to, a telematics unit that is adapted to be attached to a vehicle and that is designed, programmed and constructed to utilize a telecommunication network that allots usage time units to the telematics unit. The system also includes a call center that is designed, programmed, equipped, constructed and staffed to interface between the telematics unit and the telecommunication network to facilitate allotment of the usage time units to the telematics unit. An electronic processing device associated with the call center is designed, programmed and constructed to allocate a portion of the allotted usage time units to each individual user in a group of users of the telematics unit.

DESCRIPTION OF THE DRAWINGS

One or more examples will hereinafter be described in conjunction with the following drawing figures, wherein like numerals denote like elements.

FIG. 3 is a flow chart illustrating a non-limiting, exemplary process for using a telecommunication device with a system that facilitates the use of a single telecommunication device by multiple users.

DETAILED DESCRIPTION

Figure 1:
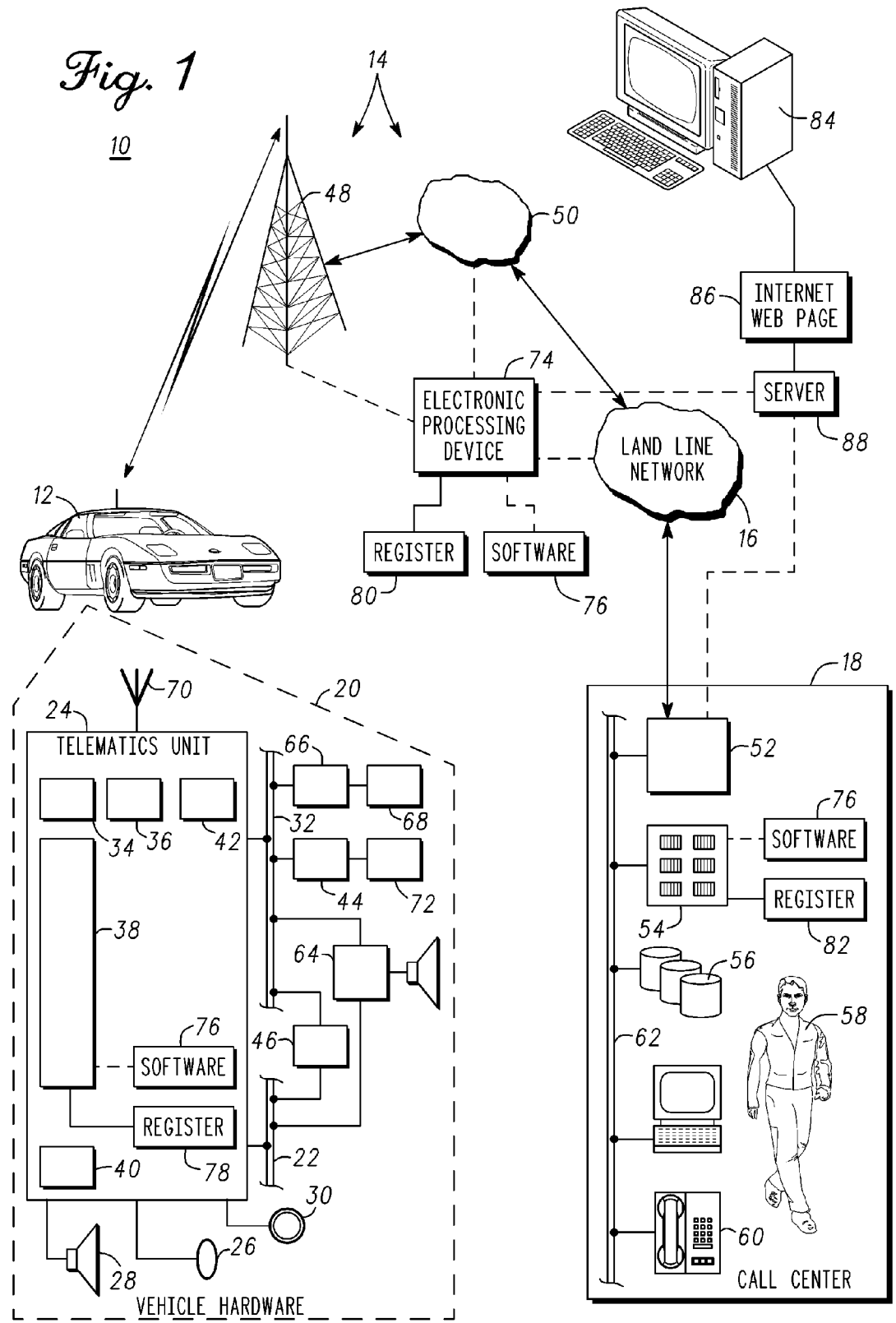
FIG. 1 is a schematic view illustrating a non-limiting example of a system for facilitating the use of a single telecommunication device by multiple users.

The following detailed description is merely exemplary in nature and is not intended to limit application and uses. Furthermore, there is no intention to be bound by any expressed or implied theory presented in the preceding technical field, background, brief summary or the following detailed description.

As used herein, the term "usage time unit" refers to an increment of time during which a user may utilize the telecommunication services of a telecommunication network. The term "usage time unit" may be used interchangeably herein with the term "minutes".

A system is disclosed herein that facilitates the use of a single telecommunication device by two or more users by providing a way to allocate to each of the users a discrete portion of the usage time units that have been allotted to the single telecommunication device. In this manner, the system helps to ensure an equitable distribution of usage time units and prevents the consumption of all of the usage time units allotted to the telecommunication device by a single user.

In the examples discussed below, the telecommunication device includes a telecommunication component such as a cellular mobile phone that is integrated into a motor vehicle and operated by an occupant of the vehicle, typically the driver. The cellular mobile phone is integrated into a telematics unit, which is discussed and described in detail below. The telematics unit is mounted to the motor vehicle and is operated and controlled using control features, such as buttons, microphones, and speakers which are mounted in the passenger compartment of the vehicle. Although the context of the discussion below is a cellular phone that is integrated into to a vehicle, it should be understood that the teachings of the present system are not limited to vehicles and are equally applicable to any type of telecommunication component, for instance, a mobile phone of any type, that is used regularly by two or more persons.

In one non-limiting example, the present system includes a vehicle mounted telematics unit, a call center and a telecommunication network. The telematics unit is designed, constructed, and programmed to utilize the telecommunication network to permit a user to engage in telephonic telecommunications. The telecommunication network provides telecommunication devices, such as the telematics unit, with a predetermined amount of usage time units (usually in increments of minutes) during which the subscriber may utilize the telecommunication network for telephonic communication. The call center is configured to serve as an interface between the telematics unit and the telecommunication network. The user of the present system may procure usage time units for the telematics unit by contacting the call center, either from the vehicle, over the telephone or over the internet, and purchasing a user specified quantity of usage time units. The call center then procures the usage time units from the telecommunication network and allots the usage time units to an account associated with the user's telematics unit.

The system further includes an electronic processing device. The electronic processing device may be associated with the telematics unit, the call center or the telecommunication network. The electronic processing device is programmed to permit a user to subdivide the allotment of usage time units into discrete portions and to allocate the discrete portions to respective users of the telematics unit. In some examples, the electronic processing device may be further programmed to track the use of usage time units by the various users and to decrement each user's respective allocation of usage time units. In other examples, the system may further comprise a separate register to track each user's consumption of usage time units. The electronic processing device may further be programmed with a security feature that requires some or all of the users to enter a password before being permitted to use the telematics unit for telephonic communications. In still other examples, one of the users of the telematics unit may be recognized as a primary user and may have privileges to allocate and reallocate the usage time units to other users and may further be permitted to use usage time units which have been allocated to other users.

A greater understanding of the system disclosed herein may be obtained through a review of the illustrations accompanying this disclosure as well as a review of the detailed discussion below.

With reference to FIG. 1, a non-limiting example of a system 10 that may be used to facilitate the use of a single telecommunication device by multiple users is illustrated. System 10 includes a vehicle 12, a telecommunication network 14, a land network 16 and a call center 18. The following paragraphs provide a brief overview of one such exemplary system 10, however, other systems not shown here could employ the present method as well.

Vehicle 12 is preferably a mobile vehicle such as a motorcycle, car, truck, recreational vehicle (RV), boat, plane, etc., and is equipped with suitable hardware and software that enables it to communicate over system 10. Some of the vehicle hardware 20 is shown generally in FIG. 1 including a telematics unit 24, a microphone 26, a speaker 28 and buttons and/or controls 30 connected to the telematics unit 24. Operatively coupled to the telematics unit 24 is a network connection or vehicle bus 32. Examples of suitable network connections include a controller area network (CAN), a media oriented system transfer (MOST), a local interconnection network (LIN), an Ethernet, and other appropriate connections such as those that conform with known ISO, SAE, and/or IEEE standards and specifications, to name a few.

The telematics unit 24 is an onboard device that provides a variety of services through its communication with call center 18, and generally includes an electronic processing device 38, one or more types of electronic memory 40, a cellular chipset/component 34, a wireless modem 36, a dual mode antenna 70 and a navigation unit containing a GPS chipset/component 42. In one example, the wireless modem 36 includes a computer program and/or set of software routines executing within electronic processing device 38.

The telematics unit 24 provides various services including: turn-by-turn directions and other navigation-related services provided in conjunction with the GPS based chipset/component 42; airbag deployment notification and other emergency or roadside assistance-related services provided in connection with various crash and/or collision sensor interface modules 66 and crash sensors 68 located throughout the vehicle and/or infotainment-related services where music, internet web pages, movies, television programs, videogames and/or other content are downloaded by an infotainment center 46 operatively connected to the telematics unit 24 via vehicle bus 32 and audio bus 22. In one example, downloaded content is stored for current or later playback.

Again, the above-listed services are by no means an exhaustive list of all the capabilities of telematics unit 24, but are simply an illustration of some of the services that the telematics unit may be capable of offering. It is anticipated that telematics unit 24 will include a number of known components in addition to those listed above.

Vehicle communications may use radio transmissions to establish a voice channel with telecommunication network 14 so that both voice and data transmissions can be sent and received over the voice channel. Vehicle communications are enabled via the cellular chipset/component 34 for voice communications and a wireless modem 36 for data transmission. In order to enable successful data transmission over the voice channel, wireless modem 36 applies some type of encoding or modulation to convert the digital data so that it can communicate through a vocoder or speech codec incorporated in the cellular chipset/component 34. Any suitable encoding or modulation technique that provides an acceptable data rate and bit error can be used with the present method. Dual mode antenna 70 services the GPS chipset/component and the cellular chipset/component.

Microphone 26 provides the driver or other vehicle occupant with a means for inputting verbal or other auditory commands, and can be equipped with an embedded voice processing unit utilizing a human/machine interface (HMI) technology known in the art. Conversely, speaker 28 provides verbal output to the vehicle occupants and can be either a stand-alone speaker specifically dedicated for use with the telematics unit 24 or can be part of a vehicle audio component 64. In either event, microphone 26 and speaker 28 enable vehicle hardware 20 and call center 18 to communicate with the occupants through audible speech. The vehicle hardware also includes one or more buttons or controls 30 for enabling a vehicle occupant to activate or engage one or more of the vehicle hardware components 20. For example, one of the buttons and/or controls 30 can be an electronic pushbutton used to initiate voice communication with call center 18 (whether it be a live advisor 58 or an automated call response system). In another example, one of the buttons and/or controls 30 can be used to initiate emergency services.

The audio component 64 is operatively connected to the vehicle bus 32 and the audio bus 22. The audio component 64 receives analog information, rendering it as sound, via the audio bus 22. Digital information is received via the vehicle bus 32. The audio component 64 provides AM and FM radio, CD, DVD, and multimedia functionality independent of the infotainment center 46. Audio component 64 may contain a speaker system, or may utilize speaker 28 via arbitration on vehicle bus 32 and/or audio bus 22.

The vehicle crash and/or collision detection sensor interface 66 are operatively connected to the vehicle bus 32. The crash sensors 68 provide information to the telematics unit via the crash and/or collision detection sensor interface 66 regarding the severity of a vehicle collision, such as the angle of impact and the amount of force sustained.

Vehicle sensors 72, connected to various sensor interface modules 44 are operatively connected to the vehicle bus 32. Examples vehicle sensors include but are not limited to gyroscopes, accelerometers, magnetometers, emission detection and/or control sensors, and the like. Example sensor interface modules 44 include powertrain control, climate control, and body control, to name but a few.

Telecommunication network 14 is preferably a cellular telephone system or any other suitable wireless system that transmits signals between the vehicle hardware 20 and land network 16. According to an example, telecommunication network 14 includes one or more cell towers 48, base stations and/or mobile switching centers (MSCs) 50, as well as any other networking components required to connect the telecommunication network 14 with land network 16. As appreciated by those skilled in the art, various cell tower/base station/MSC arrangements are possible and could be used with telecommunication network 14. For example, a base station and a cell tower could be co-located at the same site or they could be remotely located, and a single base station could be coupled to various cell towers or various base stations could be coupled with a single MSC, to list but a few of the possible arrangements. Preferably, a speech codec or vocoder is incorporated in one or more of the base stations, but depending on the particular architecture of the wireless network, it could be incorporated within a Mobile Switching Center or some other network components as well.

Telecommunication network 14 includes an electronic processing device 74, which may comprise any suitable microprocessor or computer, to control some or all of the various functions associated with providing telecommunication services. For instance, electronic processing device 74 may include one or more databases designed to store profiles and other records pertaining to users of telecommunication network 14. Electronic processing device 74 may be further programmed and configured to allot usage time units to each user of telecommunication network 14 and to track and decrement the use of usage time units from an account corresponding to each user.

Land network 16 can be a conventional land-based telecommunication network that is connected to one or more landline telephones and connects telecommunication network 14 to call center 18. For example, land network 16 can include a public switched telephone network (PSTN) and/or an Internet protocol (IP) network, as is appreciated by those skilled in the art. Of course, one or more segments of the land network 16 can be implemented in the form of a standard wired network, a fiber or other optical network, a cable network, other wireless networks such as wireless local networks (WLANs) or networks providing broadband wireless access (BWA), or any combination thereof.

Call center 18 is designed to provide the vehicle hardware 20 with a number of different system back-end functions and, according to the example shown here, generally includes one or more switches 52, servers 54, databases 56, live advisors 58, as well as a variety of other telecommunication and computer equipment 60. These various call center components are suitably coupled to one another via a network connection or bus 62, such as the one previously described in connection with the vehicle hardware 20. Switch 52, which can be a private branch exchange (PBX) switch, routes incoming signals so that voice transmissions are usually sent to either the live advisor 58 or an automated response system, and data transmissions are passed on to a modem or other piece of computer equipment 60 for demodulation and further signal processing. The computer equipment 60 may include an encoder, as previously explained, and can be connected to various devices such as a servers 54 and database 56. For example, database 56 could be designed to store subscriber profile records, subscriber behavioral patterns, or any other pertinent subscriber information. Although the illustrated example has been described as it would be used in conjunction with a manned call center 18, it will be appreciated that the call center 18 can be any central or remote facility, manned or unmanned, mobile or fixed, to or from which it is desirable to exchange voice and data.

To make telephone calls using the cellular chipset/component 34 of telematics unit 24, a user may need to first procure usage time units from telecommunication network 14. In one non-limiting example, a user located in vehicle 12 will utilize buttons or controls 30 to contact call center 18. The user will reach a live advisor 58 and request to purchase usage time units. In other examples, this process may be automated or accomplished using voice recognition or other software without the need for involvement by live advisor 58.

In response to the user's request, call center 18 contacts telecommunication network 14 and procures the requested usage time units which are then credited to the user's account. The usage time units may be registered at the telecommunication network 14 on electronic processing device 74 and/or its associated memory components. Alternatively, the minutes may be registered at the telematics unit 24 on electronic processing device 38 and/or its associated memory components. In another implementation, the minutes may be registered at the call center 18 on servers 54 and/or its associated memory components.

Any one of the three electronic processing devices identified above may be programmed and/or otherwise configured to serve as a register to record the addition of newly purchased usage time units in each user's account and to decrement usage time units from each user's account when the user makes a telephone call. Alternatively, each electronic processing device may be operatively connected to a separate register that maintains each user's account and that records and decrements usage time units from each user's account as usage time units are purchased and as phone calls are made, respectively. As illustrated in FIG. 1, electronic processing device 38 is operatively connected to register 78, electronic processing device 74 is operatively connected to register 80, and servers 54 are operatively connected to register 82.

As illustrated in FIG. 1, a computer program 76 is connected by phantom lines to electronic processing device 38, to electronic processing device 74 and to servers 54. The use of phantom lines is for the purpose of illustrating that computer program 76 may be associated with any one or more of these three electronic processing devices. For example, computer program 76 may be loaded into electronic processing device 38, but not the other two electronic processing devices. Alternatively, computer program 76 may be loaded only into electronic processing device 74. In another example, computer program 76 may be loaded only into servers 54. In still other examples, computer program 76 may be loaded into any two of the electronic processing devices. In yet another example, computer program 76 may be loaded into each of the electronic processing devices. Furthermore, although computer program 76 is referred to herein as a singular computer program, it should be understood that the term "computer program 76" also refers to a plurality of individual computer programs that cooperate to provide the functionality described herein.

In one non-limiting example, computer program 76 is written and designed to allow electronic processing device 38, electronic processing device 74 and/or servers 54 to utilize the various memory components and data bases to which they are operatively connected to set up and maintain sub-accounts under a primary account that is associated with telematics unit 24. Each sub-account corresponds to a different user associated with telematics unit 24 who uses telematics unit 24 to make telephone calls. For example, the owner of vehicle 12 and each person that the owner authorizes to use vehicle 12 may be a user of telematics unit 24 and may have an associated sub-account.

Computer program 76 is further written and designed to allow a user to allocate a portion of the allotted usage time units to each sub-account. Computer program 76 is further written and designed to permit the recording of additional usage time units and the decrementing of usage time units to and from each sub-account as usage time units are purchased, allocated and consumed. In some examples, the allocation may be performed by a primary user, for instance, the owner of vehicle 12. In other examples, the allocation may be performed by any of the users. In still other examples, some, but not all users may be authorized to perform the allocation.

In some examples, computer program 76 permits the allocation to occur at the time of purchase. In other examples, the allocation may occur subsequent to purchase of usage time units. In still other examples, a user or a primary user may be permitted to re-allocate the usage time units after an initial allocation has been made.

The allocation may be accomplished through the giving of verbal instructions to live advisor 58 or through verbal instructions to an automated system running voice recognition software. In other examples, the primary user may accomplish the allocation by contacting call center 18 using a telephone and giving verbal instructions to either a live advisor or to an automated system running voice recognition software. In other examples, the primary user may accomplish the allocation using a computer 84 to access a remotely accessible internet website 86 which is operatively connected to a server 88 which may be part of telecommunication network 14 or which may be operated or associated with call center 18. Computer 84 may be any type of electronic processing device including, but not limited to personal computers such as laptop computers and desktop computers, and handheld electronic devices such as personal digital assistants and/or portable internet browsing devices. Server 88 may be in communication with electronic processing device 74, with servers 54 (through switch 52) or with electronic processing device 38 via call center 18 and may be configured to forward instructions regarding the allocation of usage time units to the respective electronic processing device and associated register.

Computer program 76 may also be written and designed to provide security to ensure that only an intended user accesses the usage time units residing in a specific sub-account. In one non-limiting example, computer program 76 may instruct the respective electronic processing device to ask the user to identify him or herself by a predetermined user name and then prompt the user to enter a password. The user may then be allowed to make the phone call and to decrement usage time units from the user's account only after a correct password has been received. In other examples, instead of using a password, system 10 may be configured to recognize biometric signatures, such as a user's voice print, as a means of confirming that the appropriate user is attempting to utilize a corresponding portion of usage time units. In other examples, a combination of biometric signatures and passwords may be required before a user may utilize his portion of usage time units, while in other examples, a biometric signature may be the primary means of security and a password may serve as a backup or redundant security method, or vice versa.

Computer program 76 may be written to allow a primary user, such as the vehicle owner, to use usage time units from the sub-account of any of the users after providing a password associated with the primary user. In still other examples, computer program 76 may be written to permit other users to also have the authority use usage time units from sub-accounts other than their own.

Figure 2:
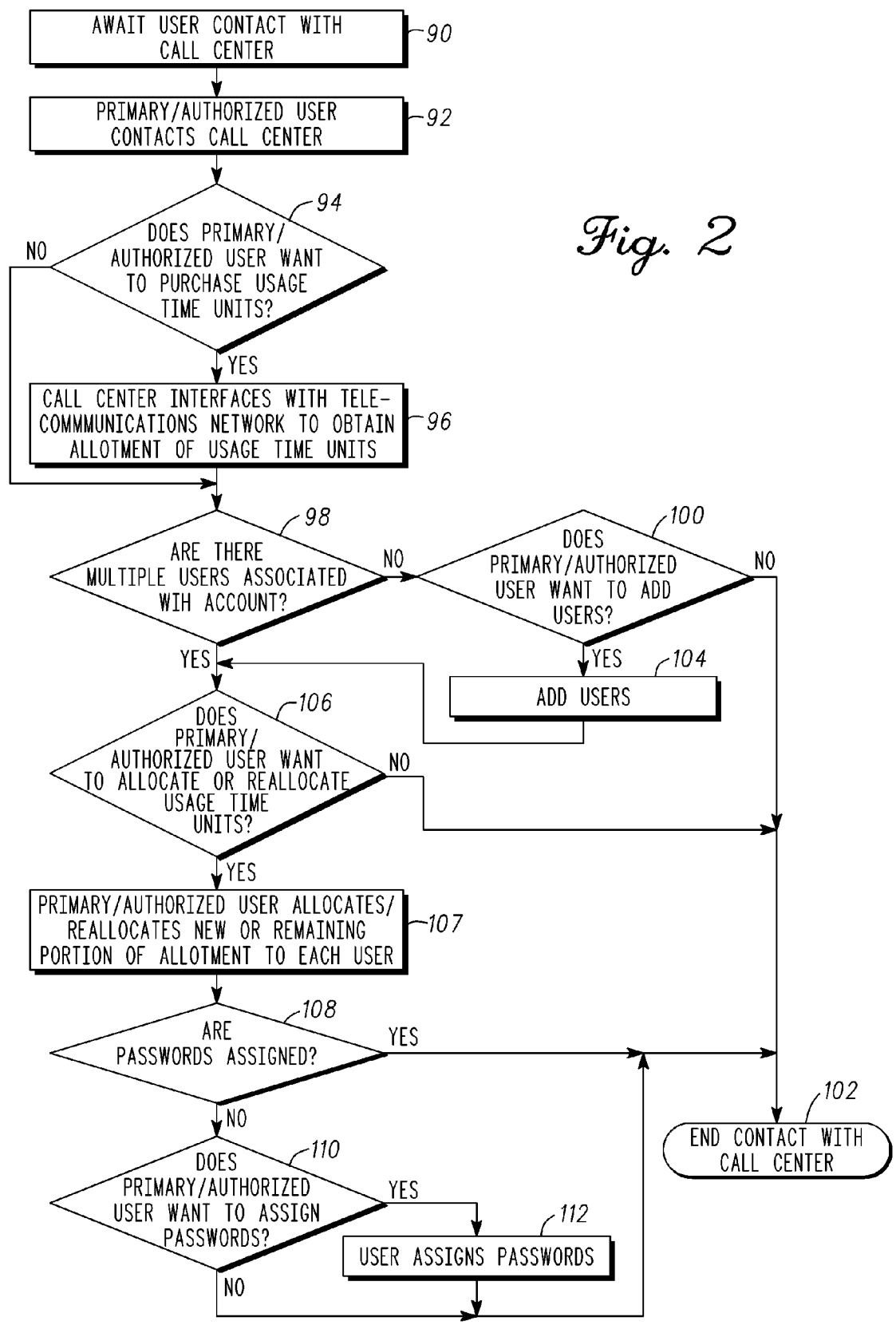
FIG. 2 is a flow chart illustrating a non-limiting, exemplary process for allocating usage time units to multiple users of a single telecommunication device.

With reference to FIG. 2, a flow chart is illustrated that depicts a non-limiting example of a process for allocating portions of an allotment of usage time units using system 10. At block 90, system 10 waits for a vehicle owner or a primary user or an otherwise authorized user to contact call center 18. At block 92, the primary user contacts call center 18. The primary user may do so while situated in vehicle 12, in which case each of the interactions between the primary user and call center 18 described with reference to FIG. 2 are verbal. In other circumstances, the primary user may contact call center 18 using computer 84, which may be situated remotely from vehicle 12, and in which case, all interactions between the primary user and call center 18 described with reference to FIG. 2 are executed using computer 84 to respond to queries presented by internet website 86.

At block 94, the primary user decides whether he or she wishes to purchase additional usage time units. If so, the primary user will interface with a live advisor 58 who contacts telecommunication network 14 to obtain a specified allotment of usage time units.

Once an allotment of usage time units have been obtained, at block 98, the primary user will have an opportunity to allocate portions of the usage time unit allotment. A primary user who, at block 94, elected not to purchase additional usage time units, will proceed directly to block 98. At block 98, the system will consider whether there are multiple users associated with the primary user. If not, at block 100, the primary user will be asked if he/she wishes to identify additional users and set up sub-accounts in a related register to receive respective portions of the allotted usage time units. If the primary user declines, then, at block 102, the contact with call center 18 ends. If the primary user does wish to add users, then at block 104, he does so.

Once the primary user adds users at block 104, or if there were already multiple users associated with the primary user (which is determined at block 98), at block 106, the primary user is given an opportunity to allocate the newly purchased allotment of usage time units or to re-allocate usage time units that are remaining in the various sub-accounts. If the primary user declines, then at block 102, the contact with call center 18 ends. If the primary user accepts, then at block 106, the primary user allocates portions of the usage time unit allotment to some or all of the existing users.

In examples of system 10, such as the example illustrated in FIG. 2, where computer program 76 is written to require passwords to prevent unauthorized consumption of usage time units, at block 108, system 10 evaluates whether each sub-account associated with vehicle 12 has a password assigned. If so, then, at block 102, the contact with call center 18 ends. If not, then at block 110, the primary user will be asked whether he would like to assign a password to each sub-account. If the primary user declines, then at block 102, the contact with call center 18 ends. If the primary user accepts, then at block 112, the primary user assigns a password to each sub-account after which, at block 102, the contact with call center 18 ends.

With respect to FIG. 3, a flow chart depicts a non-limiting example of a process by which a user may use system 10 to make a telephone call from vehicle 12 using telematics unit 24. The process described in FIG. 3 involves an example of system 10 wherein electronic processing device 38 is running computer program 76 and the decrementing of each user's sub-account occurs within telematics unit 24. The use of different examples of system 10 wherein computer program 76 is loaded onto electronic processing devices associated with telecommunication network 14 and/or call center 18 would be substantially the same.

At block 114, system 10 waits for a user to make a request to place a phone call. At block 116, a user, situated in vehicle 12, makes a request to use system 10 to make a phone call. To make this request, the user uses buttons and/or controls 30 to activate cellular chipset/component 34 of telematics unit 24. At block 118, an automated voice response, controlled by electronic processing device 38, prompts the user to identify himself. The user may identify himself by name, nick name, account number, by providing biometric information or by any of a number of other ways that are effective to enable electronic processing device 38 to recognize and identify which user is seeking to place the phone call.

At block 120, electronic processing device 38 determines whether a password is required before the user may be permitted to utilize the usage time units allocated to the user's sub-account. Electronic processing device 38 communicates with its associated memory components and data bases to make this determination.

If a password is required, then at block 122, electronic processing device 38 prompts the user to enter his password. Once the user provides his password, at block 124, electronic processing device 38 compares the password provided by the user with the password associated with the user's sub-account. If the password is incorrect, then at block 126, electronic processing device 38 determines whether the number of times that an incorrect password has been provided equals a predetermined limit. If it does not, then electronic processing device 38 returns to block 122 and again requests the user to provide his password. This process repeats itself until the number of attempts to enter a password equals a predetermined limit. Once the predetermined limit is reached, at block 128, the call is ended.

If the user enters a correct password, or if no password is required, then at block 130, electronic processing device 38 determines if usage time units are remaining in the user's sub-account. Electronic processing device 38 may make this determination by communicating with register 78 or by communicating with other associated memory and/or database components. If there are usage time units remaining in the user's associated sub-account, then at block 132, the user is allowed to place a phone call over telecommunication network 14. Electronic processing device 38 or register 78 decrements the usage time units consumed during the phone call from the user's sub-account. When the user has finished the phone call, then at block 128, the phone call ends and system 10 returns to block 114 where it awaits another request for phone service.

If the user does not have usage time units remaining in his associated sub-account, then at block 134, electronic processing device considers whether the user is the primary user or is otherwise authorized to take usage time units from the sub-accounts of other users. If the user is a primary user or is otherwise authorized to take usage time units from other users, then at block 136, the user is given the option of taking usage time units from another user. If the user chooses to take usage time units from another user, then at block 138, the user identifies which other user's sub-account should be decremented and by what amount. At block 132, the user is then permitted to place the phone call.

If the user chooses not to take usage time units from another user, then at block 140, the electronic processing device considers whether the user is a primary user or is otherwise authorized to purchase additional usage time units from telecommunication network 14. If not, then the user's attempt to place a phone call fails and, at block 128, the attempted phone call ends. The system then returns to block 114 where it awaits the next phone call attempt.

If the user is the primary user or is otherwise authorized to purchase additional usage time units, then at block 142, the user is given the option of purchasing additional time units from telecommunication network 14. If the user chooses not to purchase additional time units, then at block 128 the attempted phone call ends and the system returns to block 114 to await the next phone call attempt.

If the user chooses to purchase additional usage time units from telecommunication network 14, then at block 144 the user is connected to call center 18 for the purchase of additional usage time units. The user may then also allocate the additional usage time units to each of the sub-accounts for each of the users of telematics unit 24. With additional usage time units newly purchased and allocated, at block 132, the user may place the phone call. The user's consumption of usage time units is tracked by electronic processing device 38 or by register 78 and the user's sub-account is decremented. At block 128, the user's phone call ends and system 10 returns to block 114 where it awaits the next attempted phone call.

While at least one example has been presented in the foregoing detailed description, it should be appreciated that a vast number of variations exist. It should also be appreciated that the example or examples are not intended to limit the scope, applicability, or configuration in any way. Rather, the foregoing detailed description will provide those skilled in the art with a convenient road map for implementing the example or exemplary examples. It should be understood that various changes can be made in the function and arrangement of elements without departing from the scope as set forth in the appended claims and the legal equivalents thereof.

What is claimed is:

1. A system for facilitating use of a single telecommunication device by multiple users, the system comprising:
a telecommunication component adapted for attachment to a vehicle and configured to utilize a telecommunication network that is configured to allot usage time units to the telecommunication component; and an electronic processing device associated with the telecommunication component, the electronic processing device being configured to allocate a portion of the allotted usage time units to each user of a plurality of users of the telecommunication component.

2. The system of claim 1 wherein the electronic processing device includes a register configured to decrement the portion of the usage time units allocated to each user as each user uses the telecommunication component to utilize the telecommunication network.

3. The system of claim 1 wherein the electronic processing device is further configured to associate a respective security password with a respective user, and to prevent use of the portion of the usage time units allocated to the respective user until the respective security password has been received by the electronic processing device.

4. The system of claim 1 further comprising an internet web site in communication with the electronic processing device, the internet web site being configured to permit at least one of the plurality of users to specify a size of the portion of the usage time units to be allocated to each user.

5. The system of claim 1 wherein the electronic processing device is further configured to permit a designation of a primary user and to permit the primary user to use the portion of the usage time units allocated to each of the users.

6. The system of claim 5 wherein the electronic processing device is further configured to permit the primary user to designate a size of each portion of the usage time units.

7. The system of claim 6 wherein the electronic processing device is further configured to permit the primary user to change the size of each portion of the usage time units.

8. A system for facilitating use of a single telecommunication device by multiple users, the system comprising:
   a telecommunication network configured to allot usage time units to a telecommunication device;
   a telecommunication component adapted for attachment to a vehicle and configured to utilize the telecommunication network; and
   an electronic processing device associated with one of the telecommunication network and the telecommunication component, the electronic processing device being configured to allocate a portion of the allotted usage time units that have been allotted to the telecommunication component to each user of a plurality of users of the telecommunication component.

9. The system of claim 8 wherein the electronic processing device is associated with the telecommunication network.

10. The system of claim 9 wherein the electronic processing device includes a register configured to decrement the portion of the usage time units allocated to each user as each user uses the telecommunication component to utilize the telecommunication network.

11. The system of claim 9 wherein the electronic processing device is further configured to associate a respective security password with a respective user, and to prevent use of the portion of the usage time units allocated to the respective user until the respective security password has been received by the electronic processing device.

12. The system of claim 9 further comprising an internet web site in communication with the electronic processing device, the internet web site being configured to permit at least one of the plurality of users to specify a size of the portion of the usage time units to be allocated to each user.

13. The system of claim 9 wherein the electronic processing device is further configured to permit a designation of a primary user and to permit the primary user to use the portion of the usage time units allocated to each of the users.

14. The system of claim 13 wherein the electronic processing device is further configured to permit the primary user to designate a size of each portion of the usage time units.

15. A system for facilitating use of a single telecommunication device by multiple users, the system comprising:
   a telecommunication component adapted for attachment to a vehicle and configured to utilize a telecommunication network that is configured to allot usage time units to the telecommunication component;
   a call center configured to interface between the telecommunication component and the telecommunication network to facilitate allotment of the usage time units to the telecommunication component; and
   an electronic processing device associated with one of the telecommunication component and the call center, the electronic processing device being configured to allocate a portion of the allotted usage time units to each user of a plurality of users of the telecommunication component.

16. The system of claim 15 wherein the electronic processing device is associated with the call center.

17. The system of claim 15 wherein the electronic processing device is further configured to associate a respective security password with a respective user, and to prevent use of the portion of the usage time units allocated to the respective user until the respective security password has been received by the electronic processing device.

18. The system of claim 15 wherein the electronic processing device is further configured to permit a designation of a primary user and to permit the primary user to use the portion of the usage time units allocated to each of the users.

19. The system of claim 15 wherein the electronic processing device is further configured to permit the primary user to designate a size of each portion of the usage time units.

20. The system of claim 15 further comprising an internet web site in communication with the electronic processing device, the internet web site being configured to permit at least one of the plurality of users to specify a size of the portion of the usage time units to be allocated to each user.

* * * * *